W. SCHWARTZ.
ANTISKID CHAIN.
APPLICATION FILED MAY 28, 1919.
1,334,055.
Patented Mar. 16, 1920.
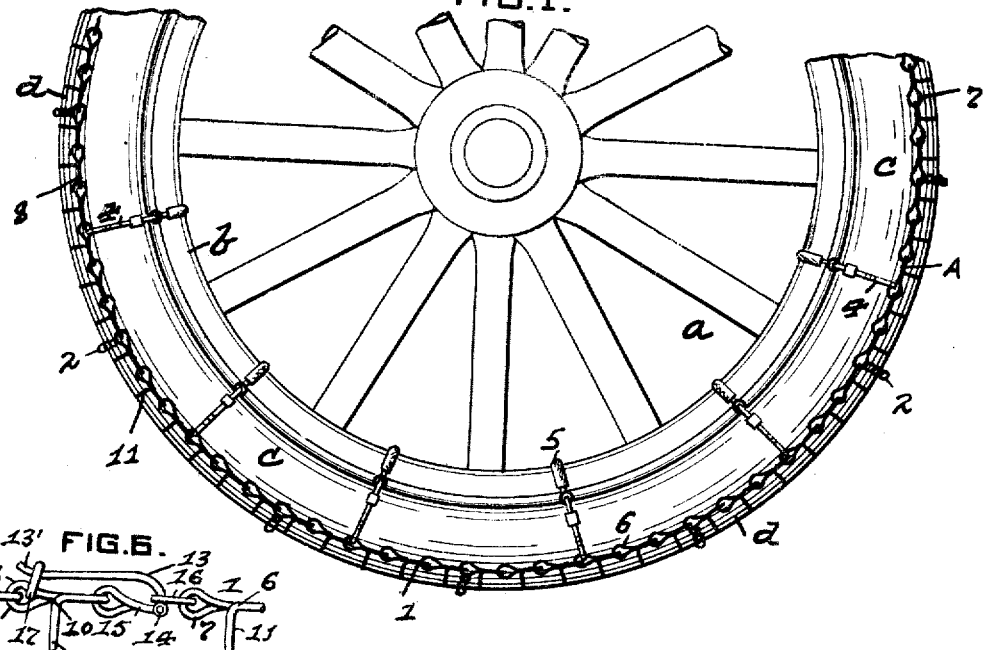
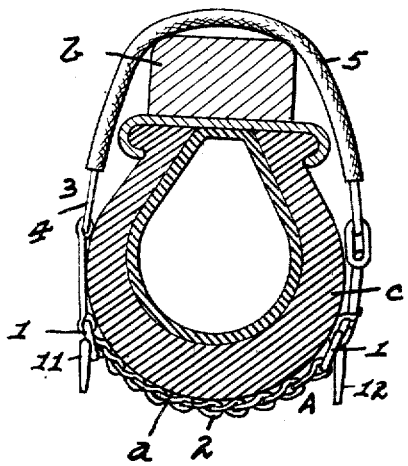
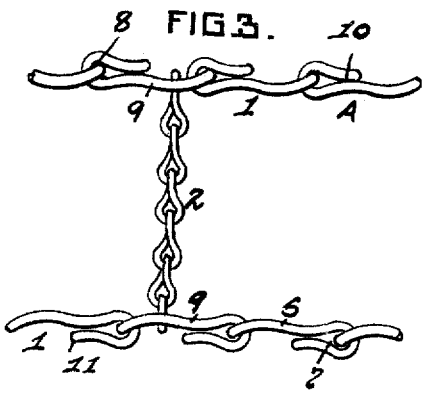
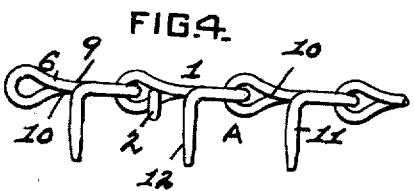
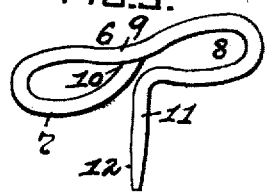
WITNESSES
J. M. Geoghegan.
Lois Brieman.
INVENTOR
William Schwartz
By J. N. Cooke
Attorney.

UNITED STATES PATENT OFFICE.

WILLIAM SCHWARTZ, OF SCOTTDALE, PENNSYLVANIA.

ANTISKID-CHAIN.

1,334,055.  Specification of Letters Patent.  Patented Mar. 16, 1920.

Application filed May 28, 1919. Serial No. 300,409.

*To all whom it may concern:*

Be it known that I, WILLIAM SCHWARTZ, a citizen of the United States, and a resident of Scottdale, in the county of Westmoreland and State of Pennsylvania, have invented a new and useful Improvement in Antiskid-Chains; and I do hereby declare the following to be a full, clear, and exact description thereof.

My invention relates to anti-skid chains, and has special reference to such chains for use in connection with pneumatic or other elastic tires, as applied to wheels on automobiles and other like vehicles.

The object of my invention is to provide a cheap, simple and efficient anti-skid chain, which can be easily and quickly applied to the ordinary automobile tire, and which when in place will form a chain which will be flexible in all directions, will prevent side skidding and will give some protection to the tire at the sides of the same.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved anti-skid chain, I will describe the same more fully, referring to the accompanying drawing, in which:

Figure 1 is a side view of a vehicle wheel showing my improved anti-skid chain in position for use;

Fig. 2 is an enlarged cross-section of the tire and rim of such wheel showing the chain applied thereto;

Fig. 3 is a plan view of a portion of the chain removed from the wheel;

Fig. 4 is a side elevation of the same;

Fig. 5 is a perspective view of one of the tread chain links, and

Fig. 6 is a side view showing the lock for connecting the ends of the tread chains.

Like symbols of reference herein indicate like parts in each of the figures of the drawing.

As illustrated in the drawing $a$ represents the ordinary automobile wheel and the usual felly $b$ which is provided with the usual pneumatic tire $c$ around the same, and provided with the tread portion $d$.

My improved anti-skid chain A comprises the two circumferentially arranged tread chains 1, each of which is placed on each side of the tread portion $d$ on the tire $c$ and is adapted to bear against the same. These two tread chains 1 are connected with each other by a series of cross or traction chains 2, which are spaced apart from each other and extend over and are adapted to bear against the tread portion $d$ on the tire $c$. The chain A is supported on the tire $c$ of the wheel $a$ by means of a series of attaching chains, 3, which are connected to the tread chains 1 by being secured at one end to one of said tread chains and detachably secured at the other end to the other of said tread chains by means of the ordinary spring clip 4. These attaching chains 3 extend from the tread chains 1 around the base of the tire $c$ and under and around the felly $b$, and in order not to mar or injure such felly, the chains 3 are provided with a tubular casing 5 surrounding such chains, which is preferably formed of rubber or other suitable resilient or flexible material for bearing against such felly.

The links 6 of the tread chains 1 are each provided with the eyes 7 and 8 at each end of the same for being connected to each other, and formed from a single piece of metal. In the formation of the links 6 from the metal rod, the end of such rod after forming the eye 7 is welded to the connecting portion 9 between the eyes 7 and 8, as at 10, while the other end of such rod after forming the eye 8 is turned down to form the outwardly projecting portion 11. In such formation the rod is twisted, so that each of the eyes therein are at right angles to each other, with the said projecting portion 11 also at right angles to said connecting portion 9 and parallel to the eye 7. These portions 11 are adapted to extend along the sides of the tread portion $d$ of the tire $c$ on the radii of the wheel $a$, and such portions are provided with the pointed or sharpened portion 12 at their outer ends. The eyes 7 and 8 of the links 6 being thus formed at right angles to each other assume such position in the tread chains 1, when placed around the tread $d$ on the tire $c$, and thus allow the face of the eyes 7 to lie against such tread.

The ends of the tread chains 1 are detachably connected together and locked by means of the locking bar 13 which is hingedly connected at 14 to one end of a link 15 and which is connected by a ring 16 thereon with the eye 7 on one end link 6, while the opposite end of such bar is turned outward, as at 13′ and is adapted to enter a ring 17 on the eye 7 on the other end link 6.

It will thus be seen that by reason of the tread chains on my improved anti-skid chain the direct wear upon the tire will be relieved as far as possible, thereby prolonging the life of such tire and preventing undue abrasion while the wheel containing such tire is in motion or traveling, while the use of such chains will bear so tightly against the sides of the tire and by reason of the construction and placing of the sides of the links against such tire sides, the liability of side skidding is overcome and protection given the tire against injury from coming in contact with articles picked up on the roads or highways or coming against the sides of the same.

It will further be seen that the use of the outwardly projecting portion having sharpened ends will permit such ends to engage the roads or highways to prevent side skidding by taking into such roads or highways and thereby enabling positive engagement with such roads or highways at all times, and the use of such projecting portion centrally of the link will keep the chain from tipping when in place.

It will be obvious that any suitable means can be employed for holding my improved chain on the tire or locking the same when in place on the tire, while various other modifications and changes in the design and construction of my improved anti-skid chain within the scope of the appended claims may be resorted to without departing from the spirit of the invention or sacrificing any of its advantages.

What I claim as my invention and desire to secure by Letters Patent is:

1. An anti-skid chain for wheels having elastic tires comprising a circumferentially arranged chain provided with twisted links having an eye at each end, and projections on said links extending outwardly therefrom and from one of said eyes and substantially parallel with the other.

2. An anti-skid chain for wheels having elastic tires comprising a circumferentially arranged chain provided with twisted links having an eye on each end, and projections on said links extending outwardly therefrom and from one of said eyes and substantially parallel with the other, said projections having sharpened outer ends.

3. An anti-skid chain for wheels having elastic tires comprising a circumferentially arranged chain provided with twisted links having an eye at each end and connected by an intermediate portion, and projections on said links extending outwardly therefrom and from one of said eyes and substantially parallel with the other, said projections being substantially centrally of the links and intermediate portions.

4. An anti-skid chain for wheels having elastic tires comprising a circumferentially arranged chain provided with twisted links having an eye at each end and connected by an intermediate portion, and projections on said links extending outwardly therefrom and from one of said eyes and substantially parallel with the other, said projections being substantially centrally of the links and intermediate portions, and provided with sharpened outer ends.

In testimony whereof, I the said WILLIAM SCHWARTZ, have hereunto set my hand.

WILLIAM SCHWARTZ.

Witnesses:
J. N. COOKE,
J. M. GEOGHEGAN.